(12) United States Patent
Sar et al.

(10) Patent No.: US 7,939,178 B2
(45) Date of Patent: May 10, 2011

(54) SHAPE-CHANGING STRUCTURE WITH SUPERELASTIC FOAM MATERIAL

(75) Inventors: David R. Sar, Corona, CA (US); Terry M. Sanderson, Tucson, AZ (US); Thomas P. McCreery, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 427 days.

(21) Appl. No.: 12/120,275

(22) Filed: May 14, 2008

(65) Prior Publication Data

US 2009/0286101 A1   Nov. 19, 2009

(51) Int. Cl.
*B32B 5/18* (2006.01)
(52) U.S. Cl. .................. 428/591; 428/613; 148/402
(58) Field of Classification Search .................. None
See application file for complete search history.

(56) References Cited

U.S. PATENT DOCUMENTS

| | | | |
|---|---|---|---|
| 2,559,827 A | 7/1951 | Northrop | |
| 5,049,591 A | 9/1991 | Hayashi et al. | |
| 5,082,207 A | 1/1992 | Tulinius | |
| 5,181,678 A | 1/1993 | Widnall et al. | |
| 5,662,294 A | 9/1997 | Maclean et al. | |
| 6,010,098 A | 1/2000 | Campanile et al. | |
| 6,264,136 B1 | 7/2001 | Weston | |
| 6,705,568 B2 | 3/2004 | Lee | |
| 6,834,835 B1 | 12/2004 | Knowles et al. | |
| 2002/0195177 A1 | 12/2002 | Hinkley et al. | |
| 2003/0036090 A1 | 2/2003 | Patil et al. | |
| 2004/0086699 A1 | 5/2004 | Schneider | |
| 2005/0157893 A1 | 7/2005 | Pelrine et al. | |
| 2005/0206096 A1* | 9/2005 | Browne et al. | 277/628 |
| 2007/0107189 A1 | 5/2007 | Prichard et al. | |
| 2008/0061192 A1* | 3/2008 | Sullivan | 244/200 |
| 2009/0072094 A1 | 3/2009 | Sanderson et al. | |

(Continued)

FOREIGN PATENT DOCUMENTS

CN             101028866           9/2007

(Continued)

OTHER PUBLICATIONS

Sanderson, Terry "Shape Memory Polymer Characterization for Advanced Air Vehicle Technologies", Raytheon Technology Today, (2007), vol. 2007, No. 4, [retrieved from internet] <www.raytheon.com/technology_today/archive/2007_issue 4.pdf>.

(Continued)

*Primary Examiner* — George Wyszomierski
(74) *Attorney, Agent, or Firm* — Renner, Otto, Boisselle & Sklar, LLP

(57) ABSTRACT

A shape-changing structure has a superelastic metal foam structural member that changes shape (morphs) to change configuration of the structure. The superelastic metal foam structural member changes shape while maintaining a continuous outer surface, with the continuous metal foam material inside the outer surface expanding, contracting, or otherwise changing shape. The superelastic metal foam material may be heated above a transition temperature to allow it to change shape, and then cooled to cause it to increase in strength, more easily maintaining its new shape. The superelastic metal foam material may be a suitable alloy, for example a nickel titanium alloy, that exhibits superelastic (pseudoelastic) behavior. The superelastic metal foam material may be a shape memory alloy material that returns to a set shape upon moderate heating. The superelastic metal elastic foam structural member may be heated either by an internal heat source or by external heating.

20 Claims, 3 Drawing Sheets

U.S. PATENT DOCUMENTS

| | | |
|---|---|---|
| 2009/0206192 A1 | 8/2009 | Sanderson et al. |
| 2009/0283643 A1 | 11/2009 | Sar et al. |
| 2009/0283936 A1 | 11/2009 | Sanderson et al. |

FOREIGN PATENT DOCUMENTS

| | | |
|---|---|---|
| EP | 0361418 A2 | 4/1990 |
| EP | 0905019 A2 | 3/1999 |
| EP | 1607602 | 12/2005 |
| GB | 2445099 | 6/2008 |
| JP | 60145385 A | 7/1985 |
| JP | 2009047179 A | 3/2009 |
| WO | 9308013 A1 | 4/1993 |
| WO | 9324300 A1 | 12/1993 |
| WO | 03068584 | 8/2003 |
| WO | 2007001392 | 1/2007 |
| WO | 2008068472 A1 | 6/2008 |

OTHER PUBLICATIONS

Thill C. et al., "Morphing Skins", Aeronautical Journal, (2008), vol. 112, No. 1129, [retrieved from internet], <www.aer.bris.ac.uk/research/fibres/morph%20pics/RoyAeroSocMorphSkin.pdf>.

International Search Report and Written Opinion from corresponding International Application No. PCT/US09/40760.

Shaw, John A. et al., "The Manufacture of Niti Foams", Proceedings of 2002 ASME International Mechanical Engineering Congress and Exposition, (2002), pp. 1-10.

Perkins, David A. et al., "Morphing Wing Structures for Loitering Air Vehicles", 45th AIAA/ASME/ASCE/AHS/ASC Structures, Structural Dynamics & Materials Conference, (2004), pp. 1.

Claims from related U.S. Appl. No. 12/120,273, filed May 14, 2008.

Claims from related U.S. Appl. No. 12/120,271, filed May 14, 2008.

* cited by examiner

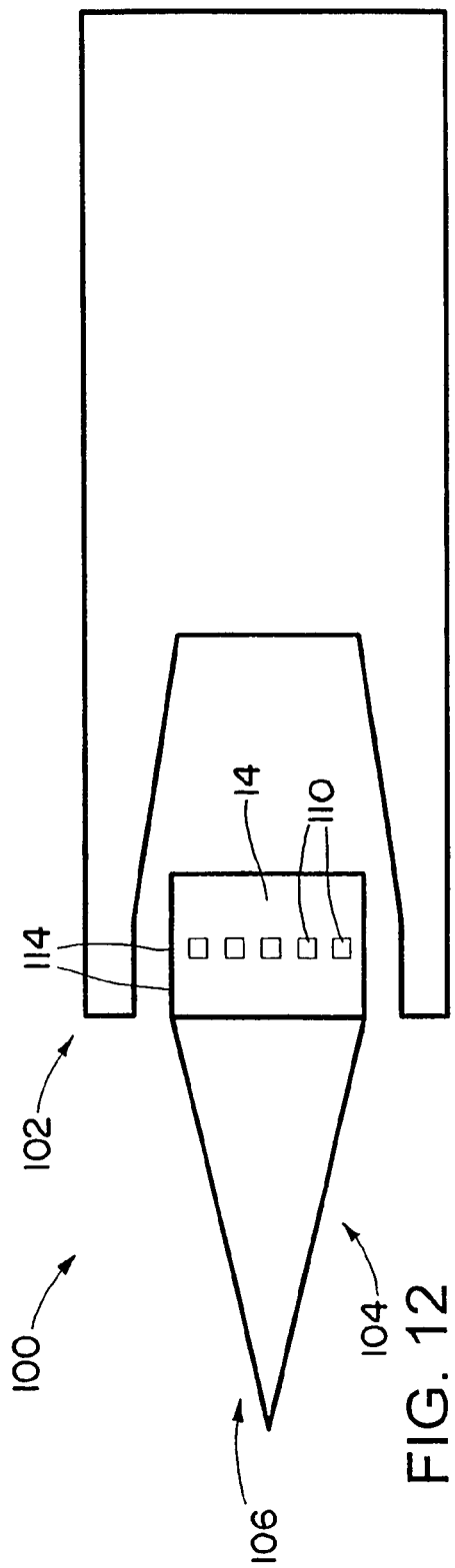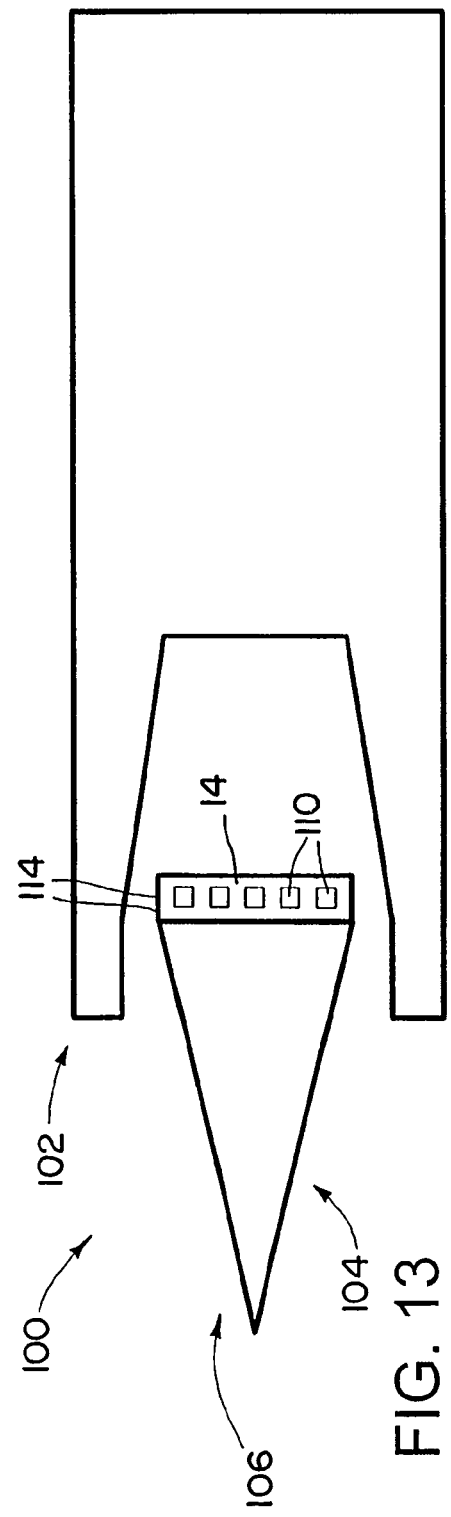

SHAPE-CHANGING STRUCTURE WITH SUPERELASTIC FOAM MATERIAL

RELATED APPLICATIONS

This application is related to two commonly-assigned concurrently-filed applications, "Structure with Reconfigurable Polymer Material" Ser. No. 12/120,271, and "Shape-Changing Structure Member with Embedded Spring" Ser. No. 12/120,273. Both of these applications are hereby incorporated herein by reference in their entireties.

BACKGROUND OF THE INVENTION

1. Technical Field of the Invention

The invention is in the field of reconfigurable structural members.

2. Description of the Related Art

Metal foam materials have been used in static structures, such as for bone replacement.

SUMMARY OF THE INVENTION

According to an aspect of the invention, a shape-changing structure includes a superelastic metal foam material structural member. The superelastic metal foam material structural member may include a metal alloy foam. The superelastic metal foam material structural member may have shape memory properties.

According to another aspect of the invention, a structural member is made of a superelastic metal foam material, for example being made of a metal alloy foam.

According to yet another aspect of the invention, a shape-changing structure includes a superelastic metal foam material structural member. The shape-changing structure has a first configuration with a first shape, and a second configuration having a second shape. The metal elastic foam structural member undergoes a shape change between the first configuration and the second configuration, while maintaining a continuous outer surface of the structural member.

According to still another aspect of the invention, a shape-changing structure includes: a superelastic metal foam material structural member; and means to change shape of the structural member while maintaining a continuous outer surface of the structural member.

According to a further aspect of the invention, a method of changing shape of a shape-changing structure, the method including the steps of: configuring the structure to have a superelastic metal foam structural member; and changing the shape of the superelastic metal foam structural member.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

In the annexed drawings, which are not necessarily to scale:

FIG. 12 is a cross sectional view of a configurable jet engine inlet, in accordance with an embodiment of the invention, with the inlet in a first configuration; and FIG. 13 is a cross sectional view of the configurable jet engine inlet of FIG. 12, with the inlet in a second configuration.

DETAILED DESCRIPTION

A shape-changing structure has a superelastic metal foam structural member that changes shape (morphs) to change configuration of the structure. The superelastic metal foam structural member changes shape while maintaining a continuous outer surface, with the continuous metal foam material inside the outer surface expanding, contracting, or otherwise changing shape. The superelastic metal foam material may be heated above a transition temperature to allow it to change shape, and then cooled to cause it to increase in strength, more easily maintaining its new shape. The superelastic metal foam material may be a suitable alloy, for example a nickel titanium alloy, that exhibits superelastic (pseudoelastic) behavior. The superelastic metal foam material may be a shape memory alloy material that returns to a set shape upon moderate heating. The superelastic metal elastic foam structural member may be heated either by an internal heat source, or by external heating, such as by solar heating. The shape-changing structure may be any of a variety of types of structures, for example including aircraft wings and space vehicle structures.

Figure 1:
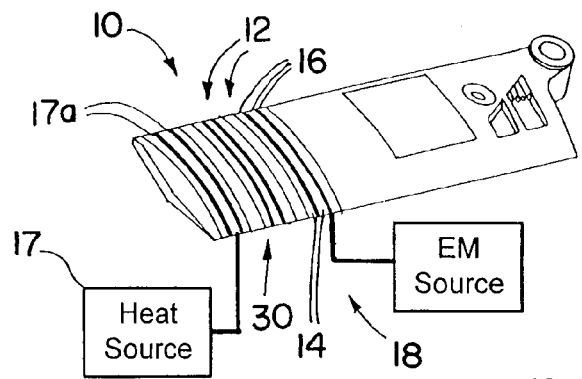
FIG. 1 is an oblique view of one structural member in accordance with an embodiment of the present invention, an extendable wing, with the wing illustrated in the retracted configuration.
Figure 2:
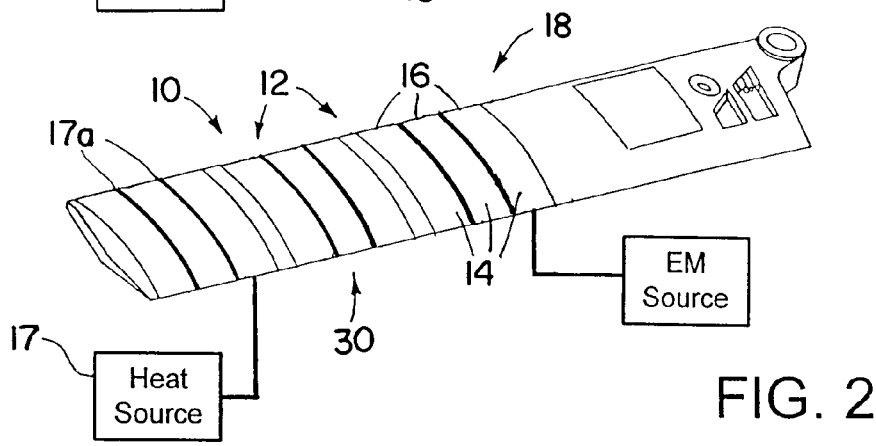
FIG. 2 shows the wing of FIG. 1 in an extended configuration.

FIGS. 1 and 2 show one example of a shape-chancing structure, a wing 10 that has a variable wingspan. The wing 10 has a number of shape-changing members 12, here being portions of the wing 10. The shape-changing wing segments 12 can be expanded and contracted to change their shapes. FIG. 1 shows the wing 10 in a first (extended) configuration, with the segments 12 each increased in volume, and lengthened in the direction of the wingspan. FIG. 2 shows the wing 10 in a second (retracted) configuration, with the segments 12 having a reduced extent in the direction of the wingspan.

The shape-changing material of the segments 12 is a superelastic metal foam material 14. Superelasticity, sometimes referred to as pseudoelasticity, refers to a situation where a solid material undergoes a phase transformation that causes a reduction of the material's modulus of elasticity (Young's modulus). When mechanically loaded, a superelastic material may reversibly deform to very high strains, such as strains of 5 to 10%, or (more narrowly) strains in the range of 6 to 8%.

The superelastic foam material may be a suitable metal alloy foam. One example of a suitable metal alloy for producing a superelastic metal foam material is a nickel titanium alloy, such as nitinol. The nitinol may be 55% nickel by weight, although other proportions may be used. Other possibilities include alloys of copper and zinc, with or without aluminum.

In addition, the material for the superelastic foam alternatively be a suitable metallic glass. Metallic glasses are metal materials that are formed by cooling a liquid metal such that the metal atoms do not form in a lattice pattern, but rather constitute an amorphous structure. Certain metallic glasses have exhibited suitable strain capabilities for use in superelastic metal foams.

The superelastic metal foam of the members 12 may have a density as low as 10 to 20 percent of theoretical density, when the foam is in an expanded state. It will be appreciated that other suitable foam densities may be employed.

The shape-changing members 12 have continuous outer surfaces 16 that remain continuous and unbroken throughout the shape change process. The shape changing process of the structure 10 thus is distinguished from structural movements in which one discrete part moves as a whole relative to another part. The maintenance of a continuous outer surface during a shape change process is advantageous in a wing, since a continuous outer surface may provide better aerodynamic properties for the wing. Shape change while maintaining a continuous outer surface may be referred to herein as "morphing."

The superelastic metallic foam structural members 12 have may advantageous properties. The metallic foam possesses considerable strength even when it is in its "relaxed" state. This allows the structural members 12 to support some level of loading even while changing shape. That is, the structural members 12 may have a large enough modulus of elasticity (Young's modulus) to withstand loads, even when the foam is in a lower modulus "relaxed" state.

The transition of the superelastic metallic foam from a high-modulus "strengthened" state to a low-modulus "relaxed" or (relatively) "soft" state may be accomplished by heating the foam above a transition temperature. For a metal alloy foam this transition temperature may correspond to a temperature at which a transition or phase transformation in the metal alloy occurs. The transition temperature at which the phase transformation takes place can be manipulated by how the metal material is alloyed or otherwise formed, and by how the metal material has been heat treated. The transition temperature thus may be set at a chosen temperature above a temperature of the environment around the foam material. Alternatively, the transition temperature may be set below a normal operating temperature of the material, or the environment around the foam material.

Heating for changing the state of the superelastic metal foam may be provided by a heat source 17. The heat source 17 may be any of a variety of suitable sources. The heating may be provided by suitable heaters that are part of the structure 10, either within or outside of the structural members 12. The heating may be provided by electric heaters 17a embedded within the structural members 12. The electric heating may be resistive heating using the metal foam itself as an electrical resistor to accomplish heating. Alternatively or in addition, the heating may be accomplished by heating elements within the structural members 12, or otherwise in thermal communication with the metal foam of the structural members 12. The heating may be conductive transmitted through the structural members 12. Other heat transport mechanisms, such as radiation, may also be employed.

The heating for changing the state of the superelastic metal foam material may come from outside the structure 10, such as from solar radiation incident on the structure 10. The structure 10 may be heated to effect a change of state that results in deployment of the structure 10 into a desired deployed configuration.

The superelastic metal foam of the structural members 12 may have a shape memory feature. One type of shape memory feature involves the material changing crystalline structure, in essence changing phase, at certain temperatures when the material is heated and cooled. This allows the material to "learn" a certain shape that may be regained by subsequent heating, after cooling and shape change of the material. Other shape memory materials rely on other forces, such as magnetic forces, to trigger the shape memory feature.

Shape memory features rely on transitions between various crystal structures that the material can be in. For example, the material may transition between austenite and martensite at certain temperatures while being heated and cooled. The material shape is set by heating the material well into the high-temperature austenite phase, and holding the material in place. Subsequently cooling of the material causes a transition into the low-temperature martensite phase. The material can be more freely deformed in the martensite phase. Then when the material is subsequently heated so that it transitions to the austenite phase, the material spontaneously reverts to the shape set into it previously when it was at a high temperature in the austenite phase.

A variety of mechanisms may be used for the force that causes the shape change in the metal foam material 14. Other parts of the structural members 12 may be used to change the shape of the metal foam material 14 by applying mechanical forces to the metal foam material 14. Also to some extent external loading or external forces, forces from outside of the structure 10, may be used in changing the shape of the metal foam material 14. Finally, the shape memory characteristics of the metal foam material 14 may be utilized in changing shape of the metal foam material 14.

FIGS. 1 and 2 illustrates a one-dimensional stretching of the metal foam material 14. It will be appreciated that a wide variety of other changes in shape and configuration of the metal foam material 14 are possible.

Figure 3:
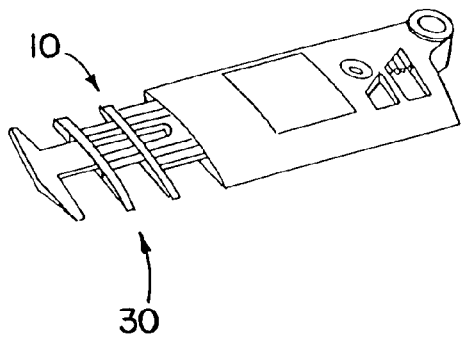
FIG. 3 shows the wing of FIG. 1 with the shape-changing material removed to show underlying extendable skeleton.

FIG. 3 shows a skeleton 30 of the structure 10. The skeleton 30 includes one or more rigid members that underlie or otherwise support the metal foam material 14. The skeleton 30 may be made of a suitable rigid material, such as a suitable metal. The skeleton 30 may itself be able to change shape, for example by being provided with an actuator to allow it to change its length, or by having parts slide relative to each other. Such actuation may be done with any of a variety of forces, such as by use of hydraulics, electric motors, or piezoelectric materials. It will be appreciated that providing a continuous surface is desirable in a large number of situations, for example in reducing drag of aircraft and other moving vehicles. The skeleton 30 may provide support for the metal foam material 14, and/or may be used to provide the force for putting a strain on the metal foam material 14, to change the shape of the metal foam material 14 when the material is in a "soft" state.

The various segments in the structure 10 may be extended/retracted individually, or substantially simultaneously.

The change in wing length may be performed to optimize speed-related characteristics of an aircraft. Longer wings may be more suitable for long-duration low-speed flying, while shorter wings may be more suitable for faster speeds.

Figure 4:
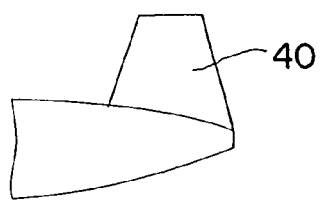
FIGS. 4 and 5 are oblique views illustrating another structural member in accordance with an embodiment of the present invention, an extendible aircraft tail in retracted and extended configurations, respectively.
Figure 5:
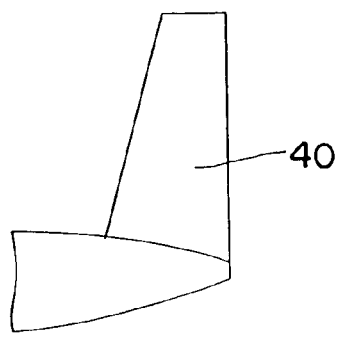
Figure 6:
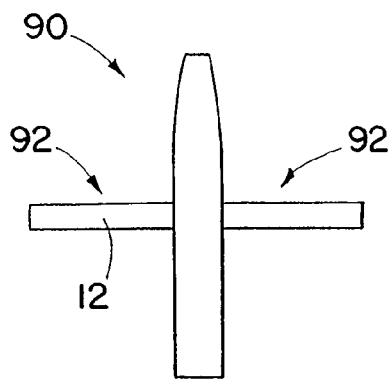
FIG. 6 is a plan view of an aircraft in accordance with an embodiment of the invention, the aircraft having configurable wings and being in a first configuration.
Figure 7:
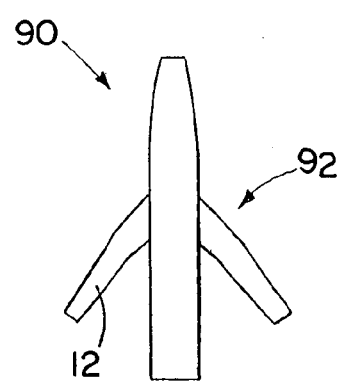
FIG. 7 is a plan view showing the aircraft of FIG. 6 in a second configuration.
Figure 8:
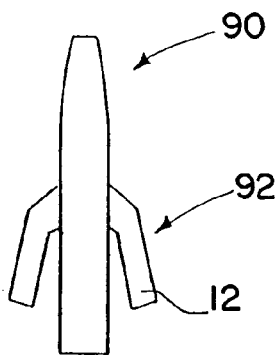
FIG. 8 is a plan view of the aircraft of FIG. 6 in a third configuration.
Figure 9:
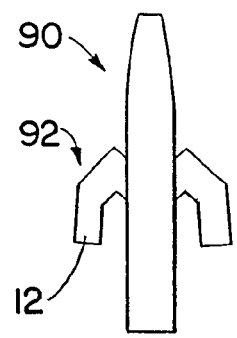
FIG. 9 is a plan view of the aircraft of FIG. 6 in a fourth configuration.
Figure 10:
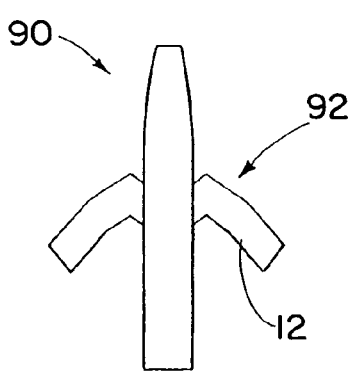
FIG. 10 is a plan view of the aircraft of FIG. 6 in a fifth configuration.
Figure 11:
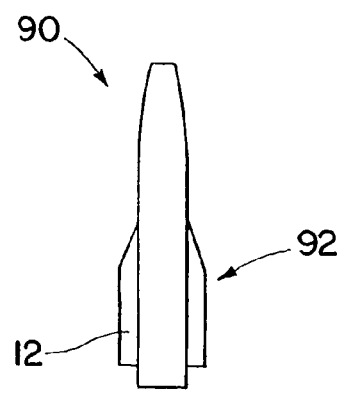
FIG. 11 is a plan view of the aircraft of FIG. 6 in a sixth configuration.

FIGS. 4 and 5 illustrates another use for the shape change material: a configurable aircraft tail 40. Many flight configurations do not require a large tail surface. In those situations a smaller tail 40 (FIG. 4) can be utilized, while retaining the ability to expand the tail area, as shown in FIG. 5, when circumstances demand it. The tail 40 may have a series of shape-changing members 12, akin to those described with regard to the wing shown in FIGS. 1 and 2.

It will be appreciated that a wide variety of other applications are possible for reshaping metal foam material 14. An example would be use as control surfaces for an aircraft. The entire trailing edge of a wing could be turned into an aileron, for example.

The foregoing aircraft-related examples illustrate only a few of the many possible uses of shape-changing materials. FIGS. 6-11 illustrate a number of configurations of an aircraft 90 having wings 92 made up of multiple segments that can be pivoted relative to one another, as well as being telescoped. A metal foam material 14 may be used for parts of the wings 92, having its shape changed or morphed to provide a continuous aerodynamically-suitable wing surface for the various possible configurations for the wings 92.

FIGS. 12 and 13 show another possible application for the metal foam material 14, as part of a jet engine 100. The jet engine 100 includes a cowling 102 that surrounds a center body 104, the cowling 102 and the center body 104 together constituting an inlet 106 for the engine 100. Either or both of the cowling 102 and the center body 104 may have metal foam material incorporated therein to change surface shape. Elements 110 may underlie the metal foam material 14 that is part of the cowling 102 or center body 104. The elements 110 may provide suitable forces on the metal foam material 14, in order to change the shape of the metal foam material 14. The elements 110 may also provide energy for heating the metal foam material 14, in order to soften the metal foam material 14 so that its shape can be altered. Changing the shape of the inlet 106 may allow for reconfiguration of the jet engine 100 for optimal performance in different flow regimes, such as subsonic and supersonic flow regimes.

It will be appreciated that a space structure may include shape memory metal foam structural members. The structure may be an antenna or other suitable structure to be deployed in space. The structure is initially in a compact folded configuration that advantageously takes up little room during launch. After launch, perhaps with removal of a covering, the structural members change shape under effect of heating, such as solar heating. As a result the structure transforms into a deployed configuration.

Other applications for structural members such as those disclosed above include in mirrors and sunshades. More broadly, the concepts described herein could be used in adjusting the shape or configuration of a wide variety of mechanical structures. Communications satellites and high precision optics are other possible applications.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A shape-changing structure comprising:
    a superelastic metal foam material structural member; and
    an extendible structure within the superelastic metal foam material structural member;
    wherein the shape-changing structure has a first configuration with a first shape, and a second configuration having a second shape; and
    wherein the metal elastic foam structural member undergoes a shape change between the first configuration and the second configuration, while maintaining a continuous outer surface of the structural member.

2. The structure of claim 1, wherein the metal elastic foam includes a metal alloy foam.

3. The structure of claim 1, further comprising a heat source used to selectively raise the metal elastic foam above a transition temperature, to cause a decrease in the stiffness of the metal foam material.

4. The structure of claim 1, wherein the shape-changing structure is part of an extendible aircraft wing.

5. A shape-changing structure comprising:
    a superelastic metal foam material structural member; and
    an internal heat source used to selectively raise the metal elastic foam above a transition temperature, to cause a decrease in the stiffness of the metal foam material;
    wherein the shape-changing structure has a first configuration with a first shape, and a second configuration having a second shape; and
    wherein the metal elastic foam structural member undergoes a shape change between the first configuration and the second configuration, while maintaining a continuous outer surface of the structural member.

6. The structure of claim 5 wherein metal elastic foam of the superelastic metal foam material structural member changes density during the shape change.

7. The structure of claim 5 wherein metal elastic foam of the superelastic metal foam material structural member maintains substantially the same density during the shape change.

8. The structure of claim 5 wherein the metal elastic foam includes a metal alloy foam.

9. The structure of claim 8, wherein the metal alloy foam includes an alloy of nickel and titanium.

10. The structure of claim 8, wherein the metal alloy foam includes a shape memory alloy.

11. The structure of claim 5, wherein the heat source includes an electric heater embedded in the metal elastic foam.

12. The structure of claim 5, wherein the heat source includes resistive heating within the metal elastic foam.

13. The structure of claim 5 wherein the shape-changing structure is part of an extendible aircraft wing.

14. The structure of claim 5 wherein the shape-changing structure is part of an extendible aircraft tail.

15. A shape-changing structure comprising:
    a superelastic metal foam material structural member;
    means to change shape of the structural member while maintaining a continuous outer surface of the structural member; and
    an extendible structure within the superelastic metal foam material structural member.

16. The structure of claim 15 wherein metal elastic foam of the superelastic metal foam material structural member changes density during the shape change.

17. The structure of claim 15 wherein metal elastic foam of the superelastic metal foam material structural member maintains substantially the same density during the shape change.

18. The structure of claim 15 wherein the metal elastic foam includes a metal alloy foam.

19. The structure of claim 18, wherein the metal alloy foam includes an alloy of nickel and titanium.

20. The structure of claim 18, wherein the metal alloy foam includes a shape memory alloy.

\* \* \* \* \*